United States Patent [19]

Maxson et al.

[11] 4,264,035
[45] Apr. 28, 1981

[54] DUAL RESET CONTROLLER

[75] Inventors: Dale E. Maxson, Rockford, Ill.; Gilbert H. Avery, Memphis, Tenn.

[73] Assignee: Barber-Colman Company, Rockford, Ill.

[21] Appl. No.: 106,997

[22] Filed: Dec. 26, 1979

Related U.S. Application Data

[63] Continuation of Ser. No. 945,145, Sep. 22, 1978, abandoned.

[51] Int. Cl.³ ............................................ G05D 23/08
[52] U.S. Cl. ...................................... 236/87; 236/49; 251/26; 251/29
[58] Field of Search ............... 236/49, 87, 82, 91 R; 251/26, 29; 165/14, 31

[56] References Cited

U.S. PATENT DOCUMENTS

| | | | |
|---|---|---|---|
| 2,120,507 | 6/1938 | Otto | 236/91 R X |
| 2,529,875 | 11/1950 | Howard | 236/82 X |
| 2,714,894 | 8/1955 | Jewett | 137/14 |
| 3,059,854 | 10/1962 | Fehlinger | 236/91 R |
| 3,122,318 | 2/1964 | Null | 236/87 |
| 3,602,241 | 8/1971 | Puster | 236/82 X |
| 3,809,314 | 5/1974 | Engelke et al. | 236/49 |
| 4,185,772 | 1/1980 | Brakebill | 236/86 |

Primary Examiner—William E. Tapolcai, Jr.
Attorney, Agent, or Firm—Robert M. Hammes, Jr.

[57] ABSTRACT

A controller for at least one damper maintains a constant volume rate of flow of air through a duct into a controlled space for a given condition in the controlled space. The dual reset controller resets the volume rate of flow as functions of two sensed conditions.

5 Claims, 4 Drawing Figures

DUAL RESET CONTROLLER

This is a continuation of application Ser. No. 945,145, filed Sept. 22, 1978, now abandoned.

BACKGROUND OF THE INVENTION

This invention concerns control of the volume rate of flow of air through a duct. More particularly it concerns a control for maintaining a constant volume rate of flow of air through the duct at a predetermined sensed condition and resetting the constant volume rate of flow of air through the duct as functions of two sensed conditions.

In U.S. Pat. No. 4,042,173, issued Aug. 16, 1977, George C. Boyer and Raymond J. Fermanich disclose a control for maintaining a constant volume rate of flow of air through a duct at a predetermined sensed condition and resetting the constant volume rate of flow of air through the duct as a function of the sensed condition. The present invention is an improvement upon a portion of that patented control. The dual reset controller, which is the subject of this invention is independent of the employment or non-employment of the aerodynamic bias covered in the patent.

Roger P. Engelke and Marvin Zille in U.S. Pat. No. 3,809,314, issued May 7, 1974, disclosed a similar, but self-powered controller.

The apparatus in these patents and all devices of which the inventor is aware for resetting constant volume rates of flow of air through a duct are reset in response to a single sensed condition, which is all that is required in many applications. In other applications, such as those requiring morning warm-up or reheat, additional controls have been required to control these functions. This is because a certain flow of air is required to distribute the heat provided during warm-up or reheat by heat exchangers located in the duct, and, when electric heat is supplied, to prevent burn-out of the heating coils. The additional controls are expensive and increased the volume of control air required for their operation. The larger volume of required air in turn must be supplied by larger compressors and be delivered through larger tubes, both of which increase initial cost. Furthermore, the larger compressor requires more energy for its operation, thus increasing the operating cost of the system.

SUMMARY OF THE INVENTION

According to the present invention the need for additional controls to accommodate morning warm-up, reheat and other requirements is eliminated by the addition of a second means for resetting the constant volume rate of flow. The apparatus also has other uses not related to the provision of a minimum air flow. One such use provides control for a double duct system.

DESCRIPTION OF THE PREFERRED EMBODIMENTS

Figure 1:
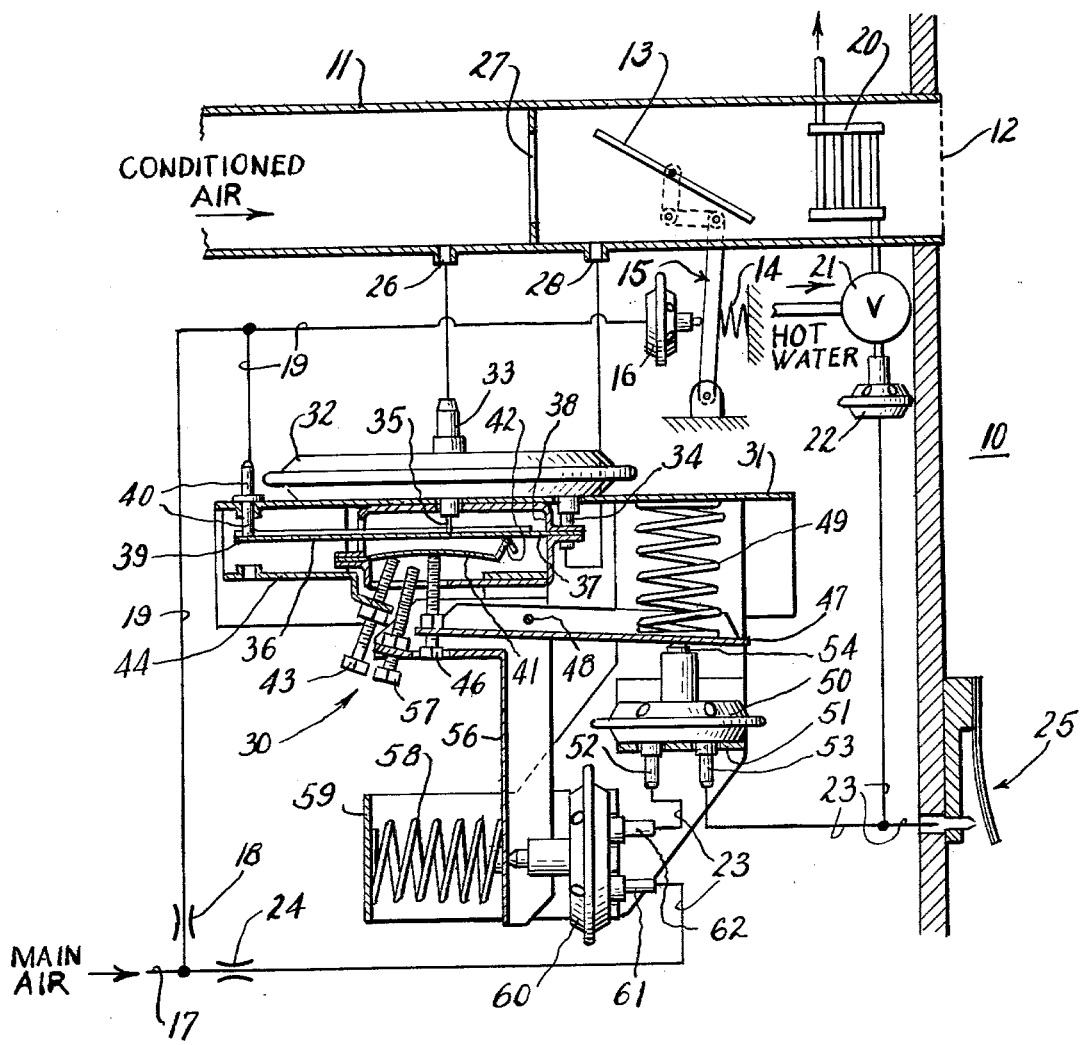
FIG. 1 is an elevation view, partially in section, of one embodiment of a dual reset controller in an application shown schematically.

FIG. 1 shows a typical dual reset controller in one application. It is assumed that the controlled space 10 is in an interior zone, which normally requires the introduction of cold air for maintenance of comfortable temperature. To meet this requirement cold conditioned air is delivered through a duct 11 and grille 12 into the controlled space. A damper 13 controls the volume rate of flow of conditioned air through the duct. It is biased to normally closed position by a spring 14 acting through a linkage 15. Variable damper branch air pressure supplied to a pneumatic damper actuator 16, positioned to oppose the bias force exerted by the spring on the linkage, determines the position of the damper. Branch air is obtained from compressed air, usually at 15 psi., supplied through a main 17. After passing through a restrictor 18 the main air becomes damper branch air in the damper branch 19 communicating with actuator 16. How the pressure of the damper branch air is varied will be disclosed later.

Under some condition the conditioned air being delivered may lower the temperature of the controlled space below the comfort level. Such a condition may occur in interior zones when less than normal heat is being generated in the controlled space, or when localized higher temperature is desired. Additional heat must then be supplied. When the conditioned air being delivered to the space is heated, the operation is referred to as reheat. Any type of controlled heat exchanger may be employed to produce reheat. A hot water-to-air heat exchanger 20 is shown installed in the duct 11 downstream from the damper 13. The control therefor is shown as a normally biased closed hot water valve 21 variably opened by a pneumatic actuator 22 as a function of the variable pressure in control branch 23. The air in the control branch is obtained from the main 17 through a restrictor 24. The pressure in control branch 23 is determined by a pneumatic thermostat 25, which is reverse acting in this application. The hot water valve is biased such that, as the controlled space temperature sensed by thermostat 25 rises from a sub-normal value, the valve begins to close at some predetermined value of control branch air pressure. This continues until the valve is closed at control branch air pressure corresponding substantially to the set point temperature. When the sensed temperature exceeds the set point temperature, the valve remains closed. Many such systems control over a 3–13 psi. range of branch air pressure with the set-point at 8 psi. The valve would then begin to close at substantially 13 psi. and become completely closed at substantially 8 psi. When the sensed temperature falls, the sequence is reversed.

The dual reset controller 30 comprises a base 31, upon which is mounted a differential pressure-to-mechanical force transducer 32. A high pressure port 33 on the transducer communicates with a high pressure tap 26 located upstream from an orifice 27 in duct 11, while a low pressure port 34 communicates with a low pressure tap 28 located downstream from the orifice, such that the transducer produces a differential force at pin 35 proportional to the difference between the pressures of air in the duct upstream and downstream from the orifice, thereby furnishing a measure of the rate of flow of conditioned air through the duct. The pin 35 bears against a rigid flapper 36, joined to a short flexible portion 37 cantilevered on a bracket 38 in spaced fixed relation to base 31. The free end 39 of the flapper is movable toward and away from a bleed nozzle 40 in communication with the damper branch 19 to control the branch air pressure therein. The flapper is biased toward the nozzle by a bias member such as a leaf spring 41 cantilevered on the bracket 38 and having a free end 42 engaging the flapper to apply a bias force in opposition to the variable differential force, thereby establishing the variable position of the flapper with respect to the nozzle. As the rate of flow of conditioned air through the duct increases, the differential pressure between taps 26 and 28 increases, producing a greater force by pin 35 against the flapper to move the flapper farther from the nozzle. This permits more air to bleed through the nozzle, thus decreasing the damper branch air pressure and reducing the force applied by the damper actuator 16, so that spring 14, acting through the linkage 15, moves the damper 13 farther toward closed position, thereby reducing the rate of flow of conditioned air through the duct in a manner tending to maintain a constant rate of air flow therethrough. In order to maintain a substantially constant rate of flow, the leaf spring 41 must apply a steady biasing force to the flapper 36. This is accomplished as by a set screw 43 threaded through a bracket 44 in fixed spaced relation to the cantilever mounting of the leaf spring. The set screw engages the leaf spring and deflects it toward the flapper, such that the advance and retraction of the set screw through the bracket increases and decreases the bias force exerted by the leaf spring upon the flapper. The adjusted position of the set screw determines a rate of flow to be maintained constant through the duct regardless of the upstream pressure of the conditioned air.

A constant rate of flow of cold conditioned air into a condition controlled space is not satisfactory. When the sensed temperature in the controlled space increases, more cold air is required and, as the temperature falls, less cold air is needed. The rate of flow of cold conditioned air into the controlled space must therefore be controlled as a function of the sensed temperature in the space. To this end the set screw 43 is advanced only enough to assure a desired minimum rate of conditioned air flow through the duct. This minimum rate must be sufficient to meet ventilation requirements. In order to increase the rate of flow when more cooling is required, variable bias adjustment is provided. As shown a control set screw 46 is threaded through a lever 47, pivoted on pin 48 in fixed relation to the base 31. A bias spring 49, acting between base 31 and the lever, exerts a bias force on the lever tending to move set screw 46 into engagement with leaf spring 41 and to thereby increase the force exerted by the free end 42 upon the flapper 36. The adjustment of set screw 46 determines when engagement occurs. A pneumatic control actuator 50 is mounted on a bracket 51 in fixed spaced relation to base 31 in a position to oppose the force of the bias spring 49 on the lever 47. The control actuator communicates with control branch 23, the branch being shown as passing into and out of the actuator through ports 52, 53, so that the actuator exerts a force, through pin 54, on the lever in proportion to the control branch air pressure, which is an inverse function of the temperature sensed by the reverse acting thermostat 25. The position of the control set screw 46 is thus determined by the sensed temperature. At low sensed temperatures the control branch air pressure is high so that control actuator 50 moves lever 47 against the bias of spring 49 to disengage control set screw 46 from leaf spring 41. The force exerted by the leaf spring upon flapper 36 is then determined by set screw 43, so that a substantially constant minimum rate of conditioned air flow is maintained through the duct 11. As the sensed temperature increases, the control branch air pressure decreases, permitting spring 49 to move control set screw 46 toward the leaf spring. When the sensed temperature indicates a demand for more cooling, the control set screw engages the leaf spring and begins to increase the force exerted by the free end 42 upon the flapper 36, thereby increasing the damper branch air pressure and causing the damper to open farther, thus permitting an increased volume rate of flow of cold conditioned air into the controlled space 10. As the sensed temperature rises higher, the force exerted by control actuator decreases further with the result that the rate of flow of cold air into the room is further increased. When the sensed temperature falls, the action is reversed so that the rate of flow is decreased until the minimum rate of flow, as determined by set screw 43, is reached. That portion of the controller 10 so far described is known.

The invention concerns the addition of a second reset mechanism to the above described controller. This second reset mechanism comprises a bellcrank lever 56 which is pivoted, as about pin 48, to move an adjusting means, such as switch-over set-screw 57 threaded through the bellcrank lever, into and out of contact with the leaf spring 41. The adjustment of the set screw determines when contact occurs. A bias spring 58, acting between the bellcrank lever and a bracket 59 in fixed spaced relation to base 31, tends to maintain the switch-over set-screw out of contact with the leaf spring, in which event the second reset mechanism is inoperative. A switch-over pneumatic actuator 60 communicates with the control branch line 23, shown as passing through the ports 61 and 62 of the switch-over actuator, so that the actuator exerts a force proportional to a variable signal provided by the control branch air pressure. This force is applied to the bellcrank lever in opposition to the bias spring 58. The position of the bellcrank lever, and of the associated switch-over set-screw 57, is determined by the balance of the forces applied to the bellcrank lever. The bias spring 58 has an installed force sufficient to overpower the force exerted by the switch-over actuator until the control branch pressure exceeds 8 psi., which is assumed to correspond to the temperature set point. The switch-over set-screw is adjusted to make contact with the leaf spring at a control branch pressure corresponding to some predetermined deviation of the sensed temperature below the set point. As the sensed temperature falls farther, the increasing control branch pressure causes the switch-over set-screw to raise the minimum pressure in the damper branch 19, thus opening the damper farther as a function of the sensed temperature. In-as-much as more hot water is being allowed to flow through the heat exchanger 20 at the same time, the conditioned air will be reheated with the volume rate of flow of conditioned air being reheated being substantially proportional to the rate of flow of hot water through the heat exchanger.

Figure 2:
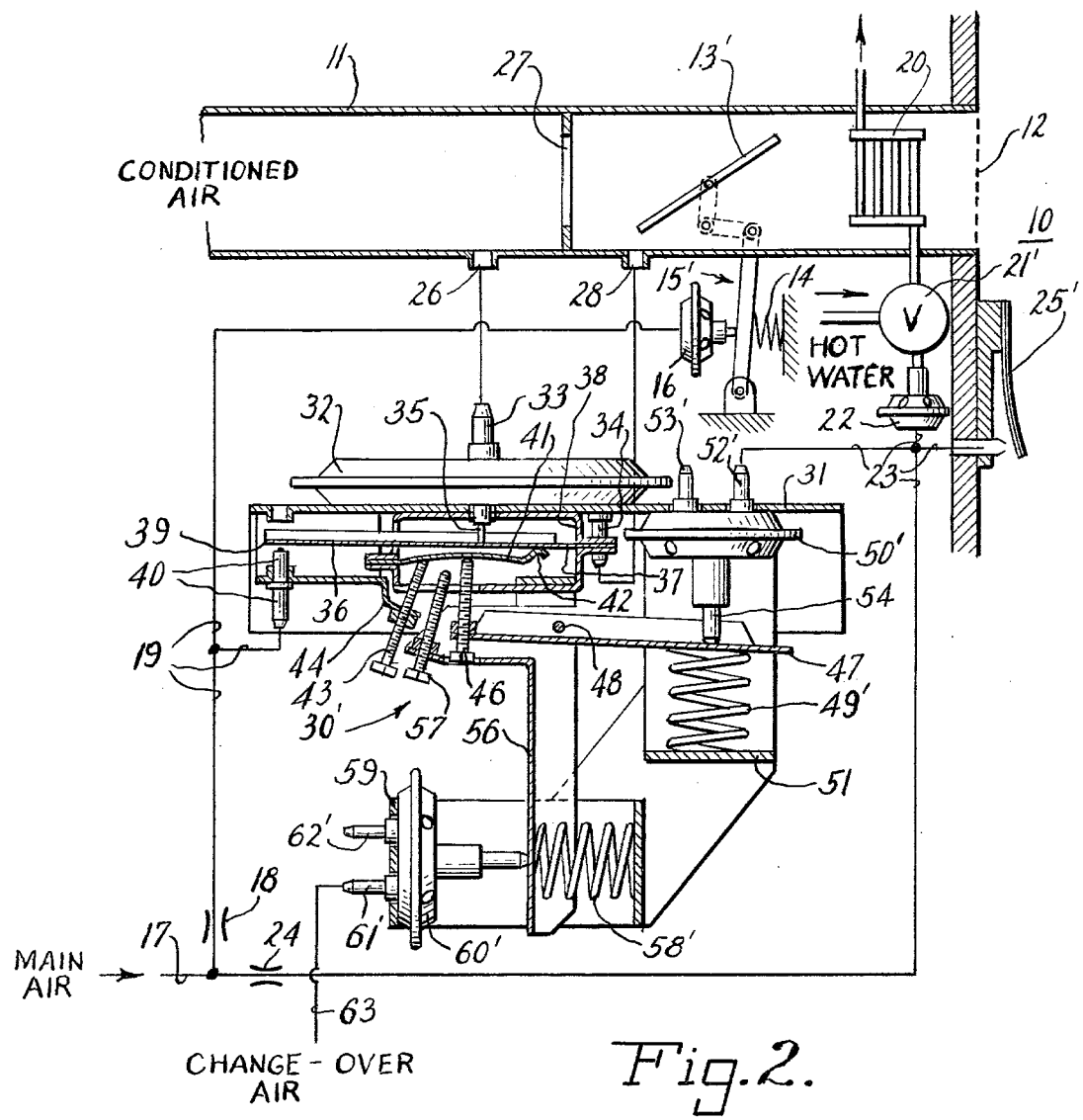
FIG. 2 is an elevation view, partially in section, of another embodiment of a dual reset controller in a different application shown schematically.

In FIG. 2 some components have changed positions from those shown in FIG. 1. This may involve changes in some of their characteristics, but their functions remain the same. When components occupy the same positions and are connected the same as in FIG. 1, the same reference numerals are employed. When components do not occupy the same positions, or are connected differently, they use the same reference numerals with a prime ('). The nozzle 40' is on the opposite side of flapper 36 from nozzle 40 so that the affect of movement of the flapper upon the damper branch air pressure is reversed, enabling use of a damper 13' biased open instead of damper 13 biased closed. The positions of bias spring 49' and control actuator 50' are reversed with respect to bias spring 49 and control actuator 50, thus permitting use of a direct acting thermostat 25' instead of the reverse acting thermostat 25. In the application shown, the valve 21' is biased open to produce the same result with the direct acting thermostat 25' as was produced by the biased closed valve 21 with reverse acting thermostat 25. The positions of bias spring 58' and change-over actuator 60' have been reversed with respect to bias spring 58 and actuator 60 so that change-over set screw 57 reduces the bias force applied to flapper 36 by leaf spring 41 as the pressure in the change-over actuator 60' is increased. Instead of branch line 23 passing through actuator 50', it communicates only with port 52', while port 53' is plugged. It will be obvious that the unused port 53' could be eliminated. The affect is the same, so the different connections may be used interchangeably.

In this application change-over actuator 60' is connected to receive a variable signal from an independent source of change-over air pressure delivered through line 63 to port 61', while port 62' is plugged. The operation of the change-over actuator and the position of change-over set screw 57 is now independent of the sensed temperature. The position of the change-over set screw is a function of the change-over pressure. Although the change-over pressure could be continuously modulated in any desired manner to variably reset the minimum rate of conditioned air flow through duct 11, the change-over pressure is usually present or absent. In this manner the minimum rate of conditioned air flow is selectively set at one of two predetermined fixed values depending upon the presence or absence of change-over air pressure. Such a system may be used for so called morning warm-up during heating season after the space temperature has been reduced during the night, or other period of disuse, to conserve energy. During morning warm-up there is no change-over pressure applied to actuator 60', so that bias spring 58' moves bellcrank lever clockwise to its limiting position. This causes set screw 57 to move upward to contact and deflect further the leaf spring 41, thus increasing the force applied to the flapper 36 by the leaf spring. The resulting movement of the free end 39 of the flapper away from nozzle 40' permits more damper branch air to bleed therethrough, reducing the damper branch pressure in damper actuator 16 and permitting spring 14 to move the damper 13' farther open to establish a higher minimum rate of flow of conditioned air through the duct. During morning warm-up the conditioned air is preferably not cooled, thereby eliminating consumption of energy required to cool the air and reducing the amount of heat supplied to heat the air. During morning warm-up the temperature sensed by direct acting thermostat 25' is low, producing a low pressure in control branch 23. This low pressure applied to control actuator 22 permits hot water to flow through valve 21' and heat exchanger 20 to heat the conditioned air flowing through duct 11 into the controlled space 10. As the sensed temperature rises, the control branch pressure increases, causing actuator 22 to gradually close valve 21' until at substantially set point temperature the valve is completely closed. When morning warm-up is completed, change-over air at a pressure sufficient to compress spring 58' is delivered through line 63 to change-over actuator 60', thus moving change-over set screw 57 out of contact with leaf spring 41 and reestablishing the lower minimum rate of conditioned air flow.

It will be obvious that the position of the nozzle 40 or 40' is determined by the bias on the damper 13 or 13' and is independent of the locations of the actuators 50, 60 or 50', 60'. In like manner the location of control actuator 50 or 50' is dependent upon whether reverse acting thermostat 25 or direct acting thermostat 25' is employed. When change-over actuator 60 or 60' is in communication with the control branch line 23, its location depends upon whether a reverse or direct acting thermostat 25 or 25' is employed. When the change-over actuator 60 or 60' is supplied with change-over air through line 63, its location is determined by whether change-over air pressure is present or absent during the morning warm-up. It will be seen that this invention covers all combinations of nozzle, control actuator and change-over actuator locations.

Figure 3:
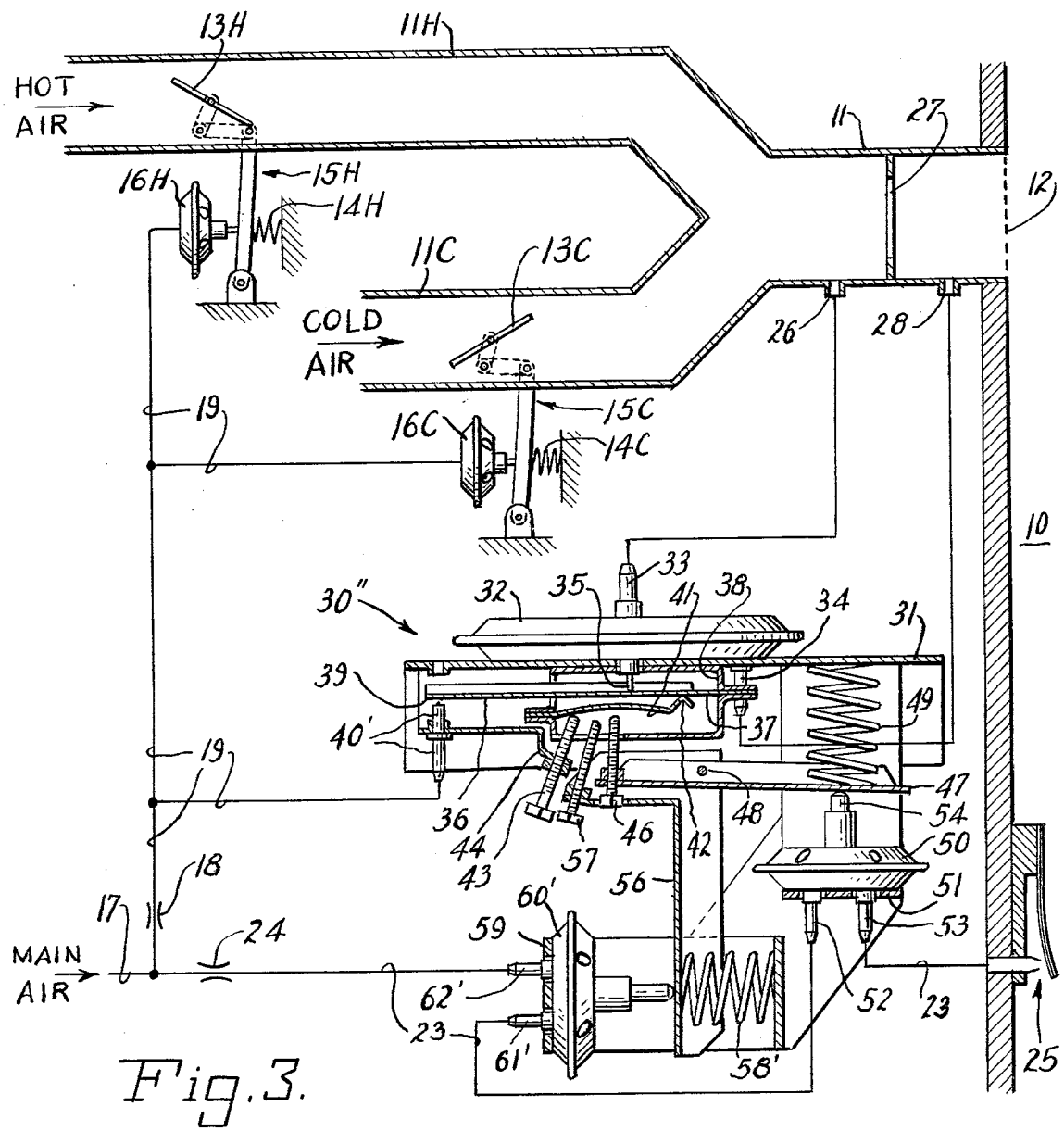
FIG. 3 is an elevation view, partially in section, of a third embodiment of a dual reset controller in a double duct application shown schematically.

FIG. 3 illustrates a different kind of application, in which the dual reset controller is employed to control the flow of hot air, cold air, or a mixture thereof into a controlled space. Once again the same reference numerals in FIGS. 1 and 2 are used where applicable. In order to distinguish duplicated components, H and C suffixes have been added to identify those used for hot air and cold air controls, respectively.

As shown the temperature controlled space 10 receives conditioned air through duct 11 and grille 12. The conditioned air in duct 11 may be hot air delivered by hot air duct 11H, cold air delivered by cold air duct 11C, or a mixture thereof. A normally closed damper 13H in the hot air duct is biased toward closed position by spring 14H acting through a linkage 15H, and opened by a pneumatic actuator 16H opposing the spring 14H. The spring is selected to maintain the damper 13H closed until the pressure in the actuator 16H exceeds a predetermined value, such as 7 psi., and to permit full opening of the damper at another predetermined pressure, such as 13 psi. A normally open damper 13'C in the cold air duct is biased toward full open position by spring 14C acting through a linkage 15C, and closed by a pneumatic actuator 16C opposing the spring 14C. The spring is selected to maintain the damper 13C fully open until the pressure in actuator 16C exceeds a predetermined value, such as 3 psi., and to permit full closure of the damper at another predetermined pressure, such as 9 psi. It will be seen that the control range of pressure is then 3–13 psi., which is common. Only cold air will be dlivered into space 10 while the air pressure in damper branch 19 is below 7 psi., mixed air will be delivered at 7–9 psi. of damper branch air pressure, and only hot air will be delivered at damper branch air pressures above 9 psi..

In this application the dual reset controller 30'' has both bias springs 49, 58' biasing the set screws 46 and 57 toward leaf spring 41, so that the free end 42 applies force tending to move flapper 36 away from bleed nozzle 40'. Both bias springs thus act to reduce air pressure in the damper branch line 19, thereby tending to maintain cold air damper 13'C open and hot air damper 13H closed. A reverse acting thermostat 25 provides low pressure in control branch 23 when the sensed temperature is high, and high pressure in the control branch when the sensed temperature is low. When the pressure in control branch 23 is at the low control pressure of 3 psi., the bias springs 49, 58' will hold lever 47 and bellcrank lever 56 in limiting positions and both set screws 46, 57 in their maximum bias producing positions. Only the most advanced one of the set screws (assume control set screw 46) contacts leaf spring 41, moving the leaf spring out of contact with the other set screw (assume change-over set screw 57). The free end 42 will then apply maximum force to flapper 36 tending to move free end 39 away from bleed nozzle 40' and to thereby reduce the air pressure in damper branch 19 to a minimum of 3 psi. or less. The differential pressure across the orifice 27, as determined by the transducer 32, will produce a differential force through pin 35 upon flapper 36 opposing the bias force applied by the leaf spring with the result that the damper branch air pressure may be increased above 3 psi. to partially close cold air damper 13'C in order to maintain a constant volume flow of cold air into the controlled space. If the resulting damper branch air pressure is below 3 psi., a constant volume flow of air into the controlled space is not maintained. As the temperature in the controlled space falls, the thermostat 25 will react to increase the air pressure in control branch 23. This increase in pressure applied to control actuator 50 will compress spring 49 and move lever 47 and its set screw 46 to reduce the bias force applied to the flapper by leaf spring 41, permitting the free end 39 to move toward the bleed nozzle 40' and restrict the bleed of air therefrom. The damper branch air pressure will then rise causing actuator 16C to compress bias spring 14C and partially close damper 13'C, thereby resetting lower the constant volume rate of flow of cold air into the controlled space. This reduction in the volume rate of flow of cold air will continue as the sensed temperature falls until, at a pressure of 9 psi. and above, the cold air damper is fully closed. At 7 psi. the hot damper 13H begins to open and becomes fully open at 13 psi. In the 7–9 psi range of pressure in the damper branch 19 mixed hot and cold air will flow into the controlled space, since both hot and cold dampers 13H, 13'C will be partially open. At some preselected air pressure in control branch 23 the control actuator 50 will retract the control set screw 46 beyond the change-over set screw 57, so that the latter will thereafter control the force applied to the flapper 36 by leaf spring 41. Let us assume that this change-over occurs at 8 psi. in control branch 23, which corresponds to the thermostat 25 sensing set point temperature in controlled space 10. The bias spring 58' would probably be selected to over balance the force exerted on bellcrank lever 56 by change-over actuator 60' until the pressure in control branch 23 exceeded 8 psi., and to permit movement of the bellcrank until the control pressure reached 13 psi. The bias spring 49 on the other hand must permit movement of lever 47 throughout the entire control pressure range of 3–13 psi. so that the control set screw 46 will be at substantially the midpoint of its travel at 8 psi. in control branch 23. Such an arrangement reduces the force applied to flapper 36 by leaf spring 41 more slowly after the change-over occurs, with a resulting slower change of pressure in the damper branch 19. By changing the adjustment of the set screws, the pressure at which the change in bias rate occurs can be modified. The pressure in damper branch 19 at which the cold air damper 13'C is fully closed and at which the hot air damper 13H begins to open need not be those specified, but may be chosen to fit the requirements of the application.

Figure 4:
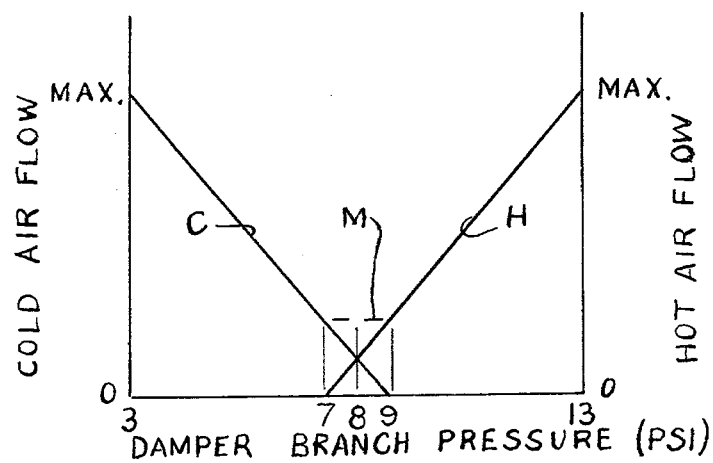
FIG. 4 is a graph showing air flow as a function of pressure for the embodiment and application as in FIG. 3.

FIG. 4 shows graphically a representative flow of air into the controlled space 10 for the application shown in FIG. 3. As described above, at 3 psi pressure in the damper branch 19, the cold air damper 13'C is full open, permitting maximum cold air flow into the controlled space, and the hot air damper 13H is fully closed, preventing flow of hot air into the space. As the branch air pressure increases, the flow of cold air into the room decreases, as shown by solid line C, until at 9 psi. the cold air damper 13'C is completely closed, preventing flow of cold air into the space. When the pressure in damper branch 19 reaches 7 psi., the hot air damper 13H begins to open, permitting hot air to flow into the space. The flow of hot air increases, as shown by solid line H, with further increases in the damper branch pressure until at 13 psi. the hot air damper is fully open, permitting maximum hot air flow to enter the controlled space. It will be noted that between 7 and 9 psi. both hot and cold air flow into the controlled space as mixed air. This produces a mixed air flow, as shown by the broken line M, so that a minimum volume rate of air flow into the space is maintained at all times to provide ventilation. The minimum volume rate of air flow may be increased by increasing the pressure spread between the beginning of opening of the hot air damper 13H and the full closing of the cold air damper 13'C. The minimum volume rate of air flow can be reduced or eliminated by decreasing the spread. Under some circumstances it may be desirable to shift the points at which hot and cold air flows become zero either upward or downward with respect to damper branch pressures. This may be indicated if the spreads between the set point and the hot and cold air temperatures are unequal. Because the difference between hot air and set point temperatures is usually greater than the difference between cold air and set point temperatures in variable volume reheat systems, lower volume rates of flow for hot air than for cold air are required to correct the same temperature differences. The hot air duct may therefore be smaller. If one or both of the hot and cold air ducts 13H and 13'C is oversized, the maximum flow through such oversized duct may be restricted to less than its maximum capacity in order to eliminate excessive drafts by limiting the opening of the damper therein. The set screw 43 may be used to accomplish this result.

It will be obvious that there are eight possible combinations of positions for the nozzle, the control actuator and the change-over actuator, although the embodiments shown and described cover only three. It is also obvious that, by judicious selection of leaf spring 41 and the bias springs 49, 58, many different ranges of pressures may be employed to produce diverse effects. To those skilled in the art equivalent constructions will become obvious.

The uses of the dual reset control are many, those shown and described being merely representative. It is apparent that control branch air pressure may be obtained through a relay type thermostat rather than as shown and described. Bladder type dampers could replace normally open butterfly dampers and their associated actuators and linkages.

We claim:

1. A dual reset pneumatic controller for providing a pneumatic control signal comprising: a pneumatic control signal bleed nozzle; a flapper associated with said nozzle; a pressure differential-to-mechanical force transducer for applying a force tending to move said flapper in one direction with respect to said nozzle; a bias member having a free end for applying a force tending to move said flapper in an opposite direction with respect to said nozzle, the position of said flapper with respect to said nozzle being determined by a balance of the opposed forces applied to said flapper, said pneumatic control signal varying as a function of said flapper position; a first pneumatic actuator for producing a first reset force as a function of a variable sensed controlled condition to alter the force applied by said bias member to said flapper; and a change-over pneumatic actuator for producing a second reset force as a function of a variable signal, a lever for transmitting force from said change-over pneumatic actuator to said bias member to alter the force applied by said bias member to said flapper, and bias means for applying force to said lever in opposition to the force produced by said change-over pneumatic actuator whereby the position of said lever is established by a balance of said forces, said lever being movable between inoperative and operative positions.

2. A controller according to claim 1 further comprising an adjustment means on said lever for selectively converting a predetermined position of said lever into a predetermined alteration of the force applied by said bias member to said flapper.

3. A controller according to claim 2 wherein said adjusting means comprises a set screw variably threaded through said lever.

4. A controller according to claim 1 wherein said variable signal varies as a function of said variable sensed controlled condition.

5. A controller according to claim 1 wherein said change over pneumatic actuator is effective to produce said second reset force only upon said variable signal attaining a predetermined level.

* * * * *